(12) United States Patent
Okai

(10) Patent No.: US 6,577,092 B2
(45) Date of Patent: Jun. 10, 2003

(54) DC MOTOR CONTROL APPARATUS

(75) Inventor: Shota Okai, Himeji (JP)

(73) Assignee: Itoh Electric Company, Limited, Himeji (JP)

( * ) Notice: Subject to any disclaimer, the term of this patent is extended or adjusted under 35 U.S.C. 154(b) by 0 days.

(21) Appl. No.: 10/054,473

(22) Filed: Jan. 22, 2002

(65) Prior Publication Data

US 2002/0101212 A1 Aug. 1, 2002

(30) Foreign Application Priority Data

Jan. 26, 2001 (JP) ........................................ 2001-018635

(51) Int. Cl.[7] ............................................... G05B 11/01
(52) U.S. Cl. ...................... 318/560; 318/430; 318/254; 318/138; 318/439; 318/280; 318/362; 388/800
(58) Field of Search ................................ 318/560, 430, 318/254, 138, 439, 280, 362; 388/800

(56) References Cited

U.S. PATENT DOCUMENTS

| | | | | |
|---|---|---|---|---|
| 4,429,262 A | * | 1/1984 | Utenick | 318/254 |
| 5,320,421 A | * | 6/1994 | Kade et al. | 303/162 |
| 5,493,188 A | | 2/1996 | Yoshikawa et al. | |
| 5,602,449 A | | 2/1997 | Krause et al. | |
| 6,186,599 B1 | * | 2/2001 | Otomo et al. | 303/20 |
| 6,215,261 B1 | | 4/2001 | Becerra | |

FOREIGN PATENT DOCUMENTS

| | | |
|---|---|---|
| JP | 8-191591 A | 7/1996 |
| JP | 11-346497 | 12/1999 |

* cited by examiner

*Primary Examiner*—Karen Masih
(74) *Attorney, Agent, or Firm*—Duane Morris LLP

(57) ABSTRACT

A DC motor control apparatus includes Hall effect devices each generating a pulse each time a DC motor rotates a predetermined angle. When a control circuit judges, based on the pulse signals generated by the Hall effect devices, that the rotation rate of the motor has decreased below a predetermined rate, with a command to stop the motor given, the control circuit generates a servo command signal. When the servo command signal is generated, the control signal also generates, based on the pulse signals, a rotation direction indicating signal to indicate that the motor should be driven to rotate in the opposite direction. After generating the servo command signal, the control circuit generates and holds a braking force indicating signal indicating the braking force in accordance with the actual rotation rate of the motor. A driver drives the motor in the direction indicated by the rotation direction indicating signal with a braking force indicated by the braking force indicating signal.

5 Claims, 6 Drawing Sheets

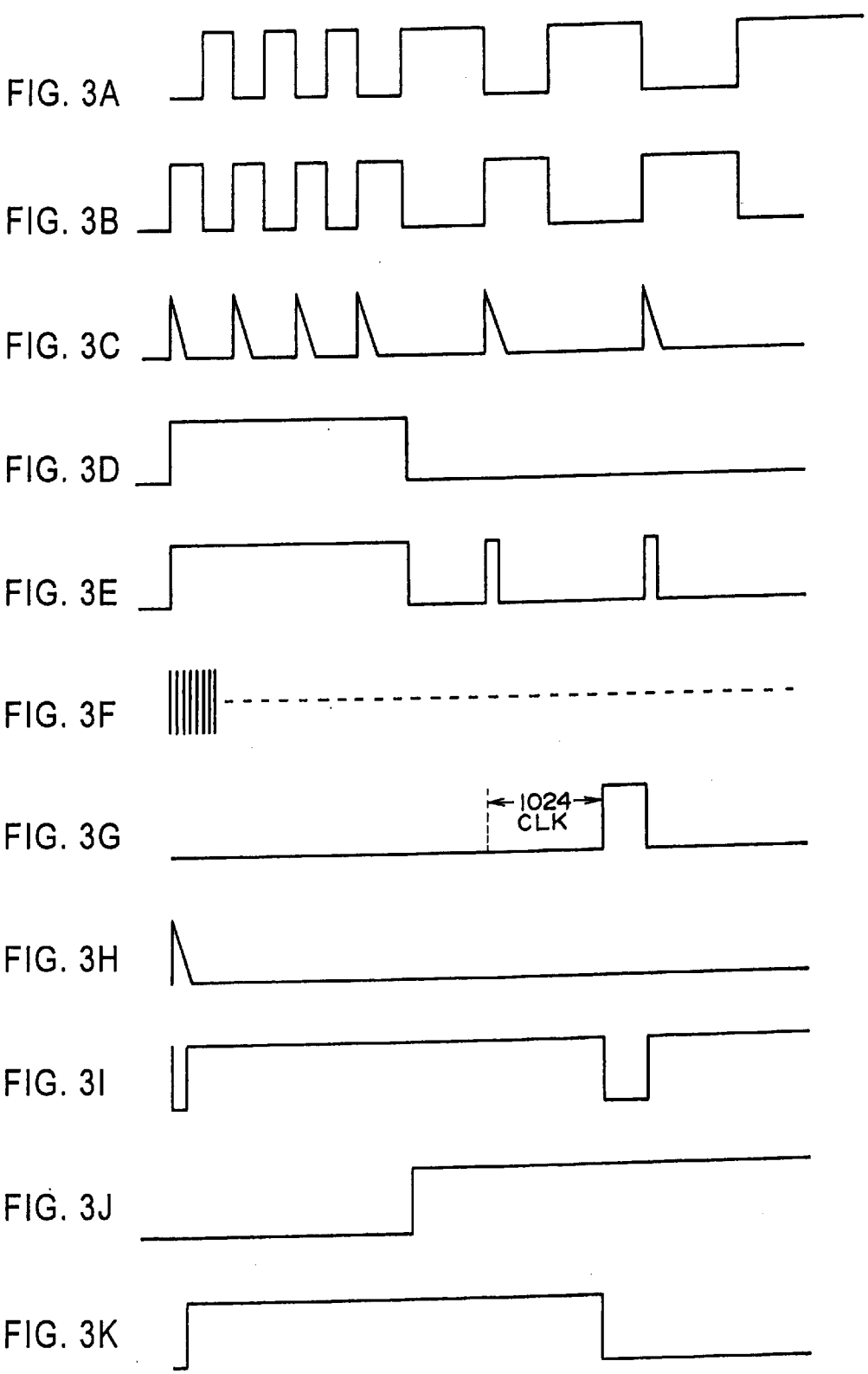

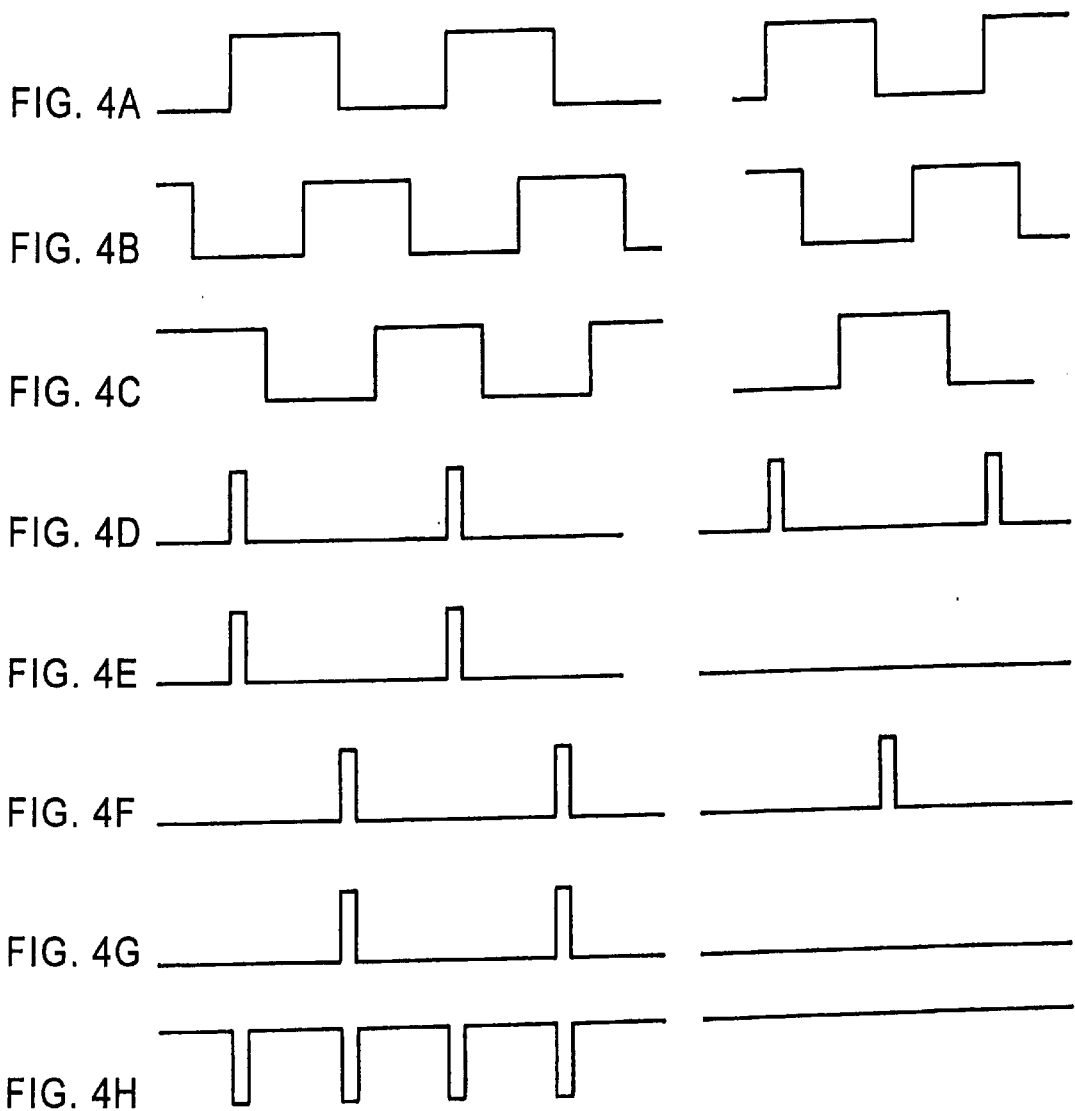

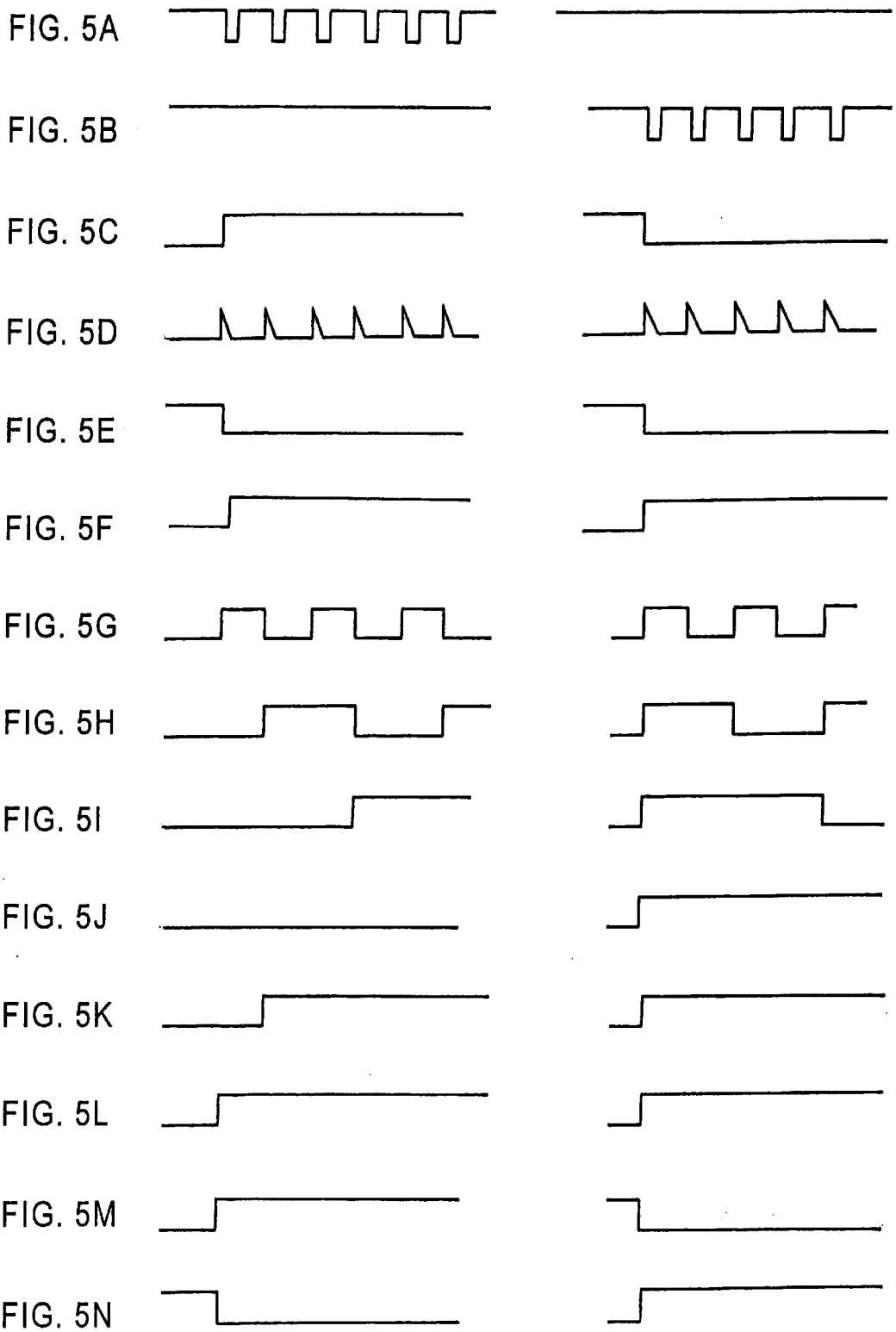

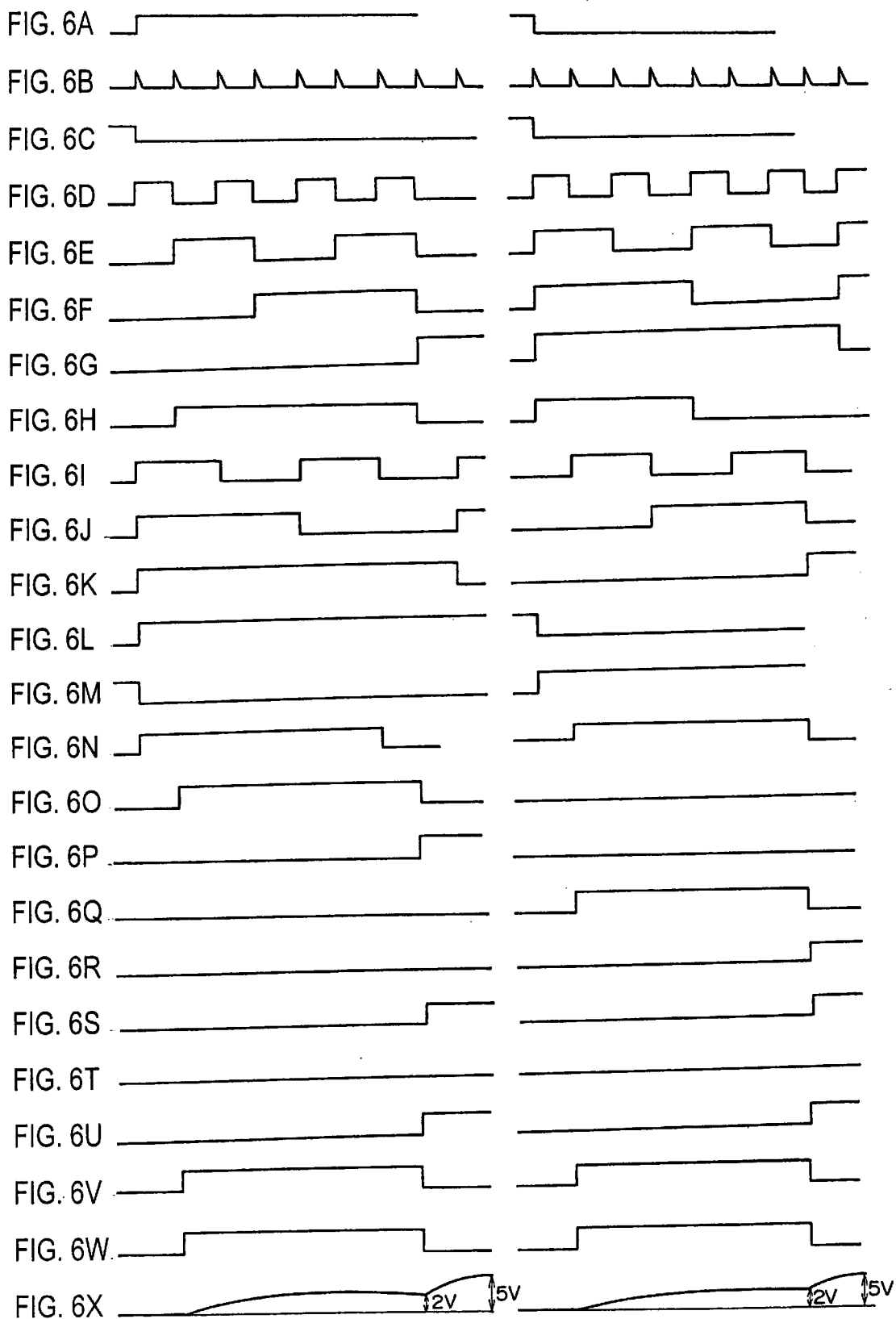

DC MOTOR CONTROL APPARATUS

BACKGROUND OF THE INVENTION

In order to control a DC motor, a rotation speed detector, e.g. an encoder, is provided for the DC motor, which develops a signal to be applied to a microcomputer, which, in turn, provides various controls for the motor, using the signal from the encoder. In particular, for braking of the DC motor, direct-current braking or plugging is employed.

However, DC braking and plugging systems provide only a small braking force or a small brake holding force. Another problem is that the encoder mounted on the motor makes the motor large-sized, which causes increase in cost. Further, an encoder has high resolution, so delicate control can be provided only when a microcomputer is used with it. If logic circuitry is employed to carry out delicate control in response to the resolution of the encoder, a large quantity of logic circuitry is required.

An object of the present invention is to provide a control apparatus for a DC motor, which can hold or maintain a large braking force. Another object of the present invention is to provide a DC motor control apparatus which can provide delicate control of a DC motor without resort to the use of a microcomputer.

SUMMARY OF THE INVENTION

A DC motor control apparatus according to the present invention includes a rotation speed detector, which generates a pulse each time a DC motor rotates a predetermined angle. One or more rotation speed detector may be used. A servo command circuit outputs a servo command signal when it judges, based on the pulses generated by the rotation speed detector, that the speed of the motor has decreased below a predetermined value due to a stop command given to the motor. When the servo command signal is generated, a rotation direction indicating circuit outputs a rotation direction indicating signal to cause the motor to rotate in an opposite direction, in accordance with the pulses. A braking force indicating circuit generates and holds a braking force indicating signal based on the actual rotation speed at which the motor rotates after the servo command signal has been generated. A driver causes the motor to rotate in the direction indicated by the rotation direction indicating signal, while applying to the motor a braking force based on the braking force indicating signal.

When the motor speed becomes lower than the predetermined speed due to the application of the stop command, the servo command signal is generated. In response to the servo command signal, the rotation direction indicating circuit commands the motor to rotate in the direction opposite to the current direction of rotation. Also, in response to the servo command signal, the braking force indicating circuit determines the braking force in accordance with the actual rotation speed of the motor. The braking force indicating signal generated by the braking force indicating circuit is applied to the driver, which, in turn, gives the motor the determined braking force in the determined direction. The braking force indicating signal is held so that the motor can be held being braked.

The servo command circuit may include a counter which count a clock signal from a predetermined initial count each time the pulse is applied to the servo command circuit, and a servo signal generator circuit which generates the servo command signal when the count in the counter reach a predetermined count.

When the motor is rotating at a rate or speed faster than the speed corresponding to the predetermined count, the pulse is generated before the counter counts the predetermined count and the count returns to the initial count. The counter, then, resumes counting from the initial count.

When the motor is rotating at a speed slower than the speed corresponding to the predetermined value, the pulse is generated by the rotation speed detector after the counter counts the predetermined value. Accordingly, by causing the servo command signal to be generated when the counter counts the predetermined value, the servo command can be given when the motor speed decreases below the predetermined speed.

The rotation speed detector may include a first rotation speed detector circuit which generates first pulses, and a second rotation speed detector circuit which generates second pulses. When the motor is rotating in the forward direction, respective first pulses precede corresponding second pulses, and when the motor is rotating in the reverse direction, the second pulses precede the corresponding first pulses. The rotation direction indicating circuit receives the first and second pulses, and generates, as the rotation direction indicating signal, a reverse direction indicating signal when the first pulses precede the second pulses and a forward direction indicating signal when the second pulses precede the first pulses.

With the above-described arrangement, the rotation direction indicating signal corresponding to the order in which the first and second pulses occur is generated.

The braking force indicating circuit may be arranged to count a clock signal prepared from the pulses provided by the rotation speed detector, and command the driver to cause the motor to rotate with a first braking force being applied to it when the count counted is within a predetermined first range, and command the driver to cause the motor to rotate with a second braking force, larger than the first braking force, being applied to it when the count counted is within a second range of counts above the first range.

With this arrangement, if the motor does not stop even with the first braking force applied to it, so that the count counted by the counter is within the second range, the second braking force larger than the first braking force is applied to the motor so that the motor can be stopped without fail.

The rotation speed detector may be provided by a Hall effect device. When a Hall effect device is used, the servo command circuit, the rotation direction indicating circuit, and the braking force indicating circuit are implemented by logic circuits.

A rotation speed detector for controlling some types of motors is not required to have a high resolution. In such a case, the cost of manufacturing the control apparatus can be reduced by using a Hall effect device and logic circuits with the rotation speed detector.

BRIEF DESCRIPTION OF THE DRAWINGS

FIGS. 3A–3K is useful in describing the operation of a servo command circuit in the control circuit shown in FIG. 2;

FIGS. 4A–4K is useful in describing the operation of a rotation direction detecting circuit in a position detecting circuit of the control circuit shown in FIG. 2;

FIGS. 5A–5N is useful in describing the position detecting circuit of the control circuit shown in FIG. 2; and FIGS. 6A–6X is useful in describing a current control circuit of the control circuit shown in FIG. 2.

DETAILED DESCRIPTION OF EMBODIMENT

Figure 1:
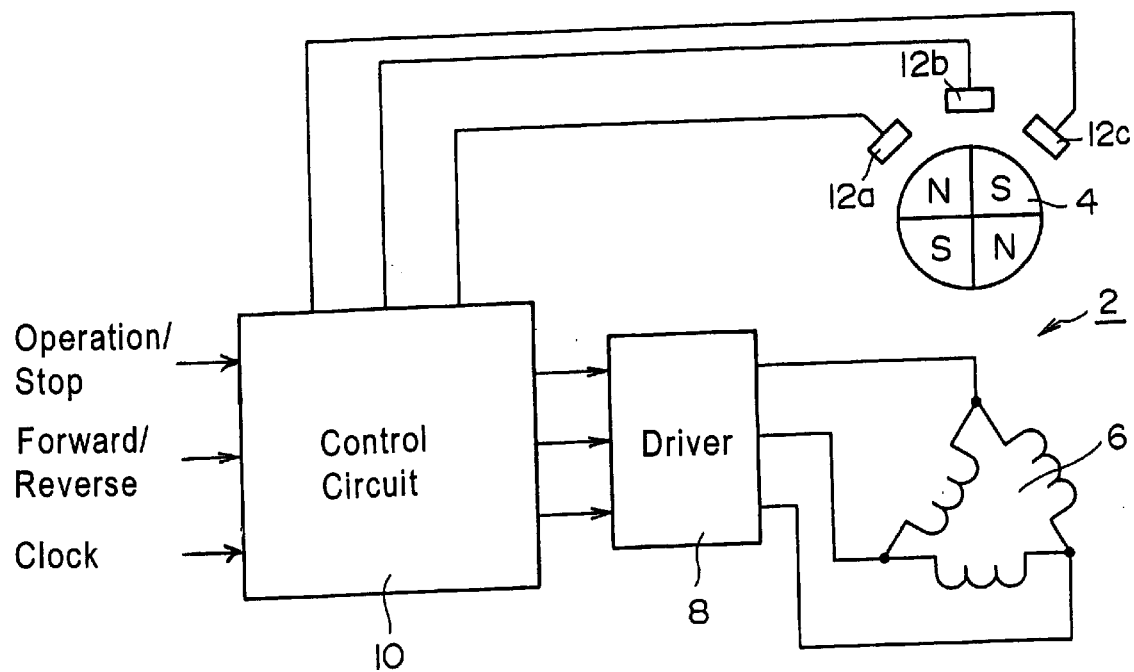
FIG. 1 is a block circuit diagram of a control apparatus according to an embodiment of the present invention.

According to one embodiment of the present invention, a DC motor control apparatus is used to control a DC motor, e.g. a DC brushless motor 2, as shown in FIG. 1. The DC motor 2 may be used for driving a load, for example, a conveyor or a winch for rolling up an advertising banner. The DC motor 2 has a rotor 4 and a stator 6. The rotor 4 may be of four-poled type. A driving signal is applied to the stator 6 from a driver 8, whereby the DC motor 2 rotates.

The driver 8 causes the DC motor 2 to rotate in accordance with a rotation command signal, a rotation direction indicating signal and a driving force indicating signal, which are supplied to the driver 8 from a rotation control circuit 10. As far as the rotation command signal is applied to the driver 8, the DC motor 2 rotates. The direction in which the DC motor 2 rotates is determined by the rotation direction indicating signal. Also, the driving force provided by the DC motor 2 is dependent on the driving force indicating signal.

The control circuit 10 receives an externally supplied operation/stop signal and an externally supplied forward/reverse signal. When the operation/stop signal is at its first state, e.g. at its high (H) level, the DC motor 2 is caused to rotate, and, when the operation/stop signal is at its second state, e.g. at its low (L) level, the DC motor 2 is stopped. When the forward/reverse signal is at its first state, e.g. at its H level, the DC motor 2 is driven to rotate forward, and when the forward/reverse signal is at its second state, e.g. at its L level, the DC motor 2 is driven to rotate in the reverse direction.

Thus, the control circuit 10 generates such rotation command and rotation direction indicating signals as to cause the driver 8 to rotate the DC motor 2 in the forward direction when the operation/stop and forward/reverse signals applied to the control circuit 10 are both at the H level. The control circuit 10 generates such rotation command and rotation direction indicating signals as to cause the driver 8 to rotate the DC motor 2 in the reverse direction when the operation/stop signal is at the H level and the forward/reverse signal is at the L level.

The driving force indicating signal is for causing the DC motor 2 to produce a predetermined constant driving force whichever direction the DC motor 2 is rotated.

In order to detect the rotation of the rotor 4, a plurality, e.g. three, of rotation speed detectors, e.g. Hall effect devices, 12a, 12b and 12c are disposed around the rotor 4 at predetermined angular intervals, e.g. sixty degrees (60°). As a pole of the rotor 4 passes each of the Hall effect devices 12a, 12b and 12c, a pulse is generated by that Hall effect device. For example, when the rotor 4 of the DC motor 2 is rotating in the forward direction, one of its poles passes the Hall effect devices 12a, 12b and 12c in the named order. This makes the Hall effect devices 12a, 12b and 12c successively generate a pulse in the named order. When the rotor 4 rotates in the reverse direction and, therefore, the same pole passes the Hall effect devices 12c, 12b and 12a in the named order, pulses are generated successively by the Hall effect devices 12c, 12b and 12a in the named order. Pulse signals from the Hall effect devices 12a, 12b and 12c are supplied to the control circuit 10 for use in braking the DC motor 2 when the operation/stop signal changes its level to the L level. The pulses generated by the Hall effect device 12a are phase shifted by 60 degrees from the pulses from the Hall effect device 12b, and the pulses from the Hall effect device 12b are phase shifted by 60 degrees from the pulses from the Hall effect device 12c.

Figure 2:
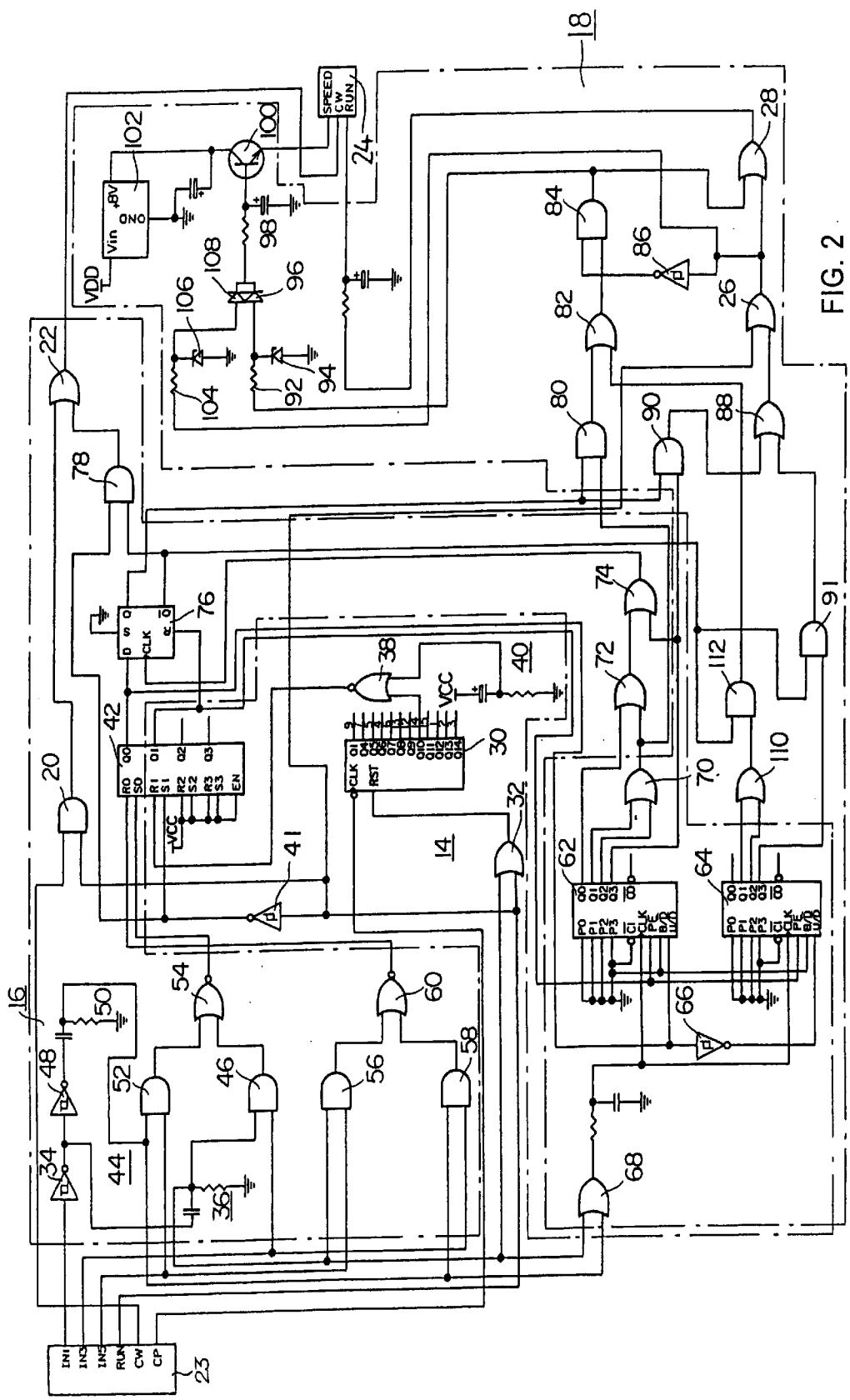
FIG. 2 is a block circuit diagram showing details of a control circuit of the control apparatus shown in FIG. 1.

FIG. 2 is a block circuit diagram showing details of the control circuit 10. As shown in FIG. 2, the control circuit 10 is formed of logic circuits. No microcomputer is used. A microcomputer may be used for the control circuit 2, but it is not necessarily required, since the Hall effect devices 12a, 12b and 12c have a resolution of 1/12 rotation, for which a microcomputer need not be used, but logic circuits are sufficient to process the signals. On the other hand, if an encoder having a high resolution of, for example, 1/100 rotation is used, a microcomputer is required to provide a fine control. A large number of logic circuits may be required to process signals from such high-resolution encoder.

As described previously, the control circuit 10 receives the operation/stop signal and the forward/reverse signal from external signal sources, and the pulse signals from the Hall effect devices 12a, 12b and 12c, through a connector 23. The pulse signals from the Hall effect devices 12a, 12b and 12c are coupled to the control circuit 10 through terminals IN1, IN3 and IN5, respectively, of the connector 23. The operation/stop signal and the forward/reverse signal are coupled to the control circuit 10 through terminals RUN and CW of the connector 23. A terminal CP of the connector 23 is for providing clock signals to a counter 30, as will be described later.

The control circuit 10 includes a servo command circuit 14, a position detecting circuit 16, and a current control circuit 18.

The servo command circuit 14 produces a rotation command signal, e.g. a servo command signal, for braking the DC motor 2 when the rotation rate of the DC motor 2 decreases to a predetermined rate, e.g. 300 r.p.m., as a result of the operation/stop signal being placed to the L level and, therefore, the driving of the DC motor 2 being stopped.

The position detecting circuit 16 detects the direction of rotation of the DC motor 2 when the servo command circuit 14 generates the servo command signal, and generates a rotation direction indicating signal to command the DC motor 2 to rotate in the direction opposite to the detected direction.

The current control circuit 18 couples this rotation direction indicating signal to the driver 8 when it receives the servo command signal. After receiving the servo command signal, the current control circuit 18 generates a first driving force indicating signal so as to drive the DC motor 2 to rotate in the above-stated opposite direction with a first driving force when the DC motor 2 is rotating at a rate within a first predetermined range of rotation rates. The current control circuit 18 provides a second driving force indicating signal so as to drive the DC motor to rotate with a second driving force larger than the first driving force when the DC motor 2 is rotating at a rotation rate within a second range of rotation rates above the first range in spite of the first driving force indicating signal provided by the current control circuit 18.

More specifically, when the rotation rate of the DC motor 2 decreases below a predetermined rotation rate after the operation/stop signal changes to the L level to thereby command the DC motor 2 to stop, the servo command signal is generated. In response to it, the actual direction of rotation of the DC motor 2 is detected, and the DC motor 2 is driven to rotate in the opposite direction. The magnitude of the current to be supplied to the DC motor 2 at this instant is indicated by the first driving force indicating signal, according to which the DC motor 2 is braked. If the DC motor 2 continues to rotate in spite of the braking, a current having a magnitude designated by the second driving force indicating signal is applied to the DC motor 2 to thereby apply a larger braking force causing the DC motor 2 to stop.

After the DC motor 2 stops rotating, a current determined in accordance with the first or second driving force indicating signal is continuously applied to the DC motor to maintain the braking force.

Next, the operation of the control circuit 10 when the forward/reverse signal at the terminal CW of the connector 23 is at the H level (indicating that the DC motor 2 should rotate in the forward direction) with the operation/stop signal at the terminal RUN of the connector 23 being at the H level (indicating that the DC motor 2 should be rotated) is described. The forward/reverse signal at the H level is applied to one input of an AND gate 20 of the position detecting circuit 16, and the operation/stop signal at the H level is applied to the other input of the AND gate 20. Accordingly, the output of the AND gate 20 is at the H level. The H level output is coupled through an OR gate 22 to a rotation direction indicating terminal (CW) of a connector 24 for connection to the driver 8. This causes the driver 8 to drive the motor 2 to rotate in the forward direction. The H level operation/stop signal is coupled through OR gates 26 and 28 of the current control circuit 18 to a rotation command terminal (RUN) of the connector 24 so that the driver 8 drives the DC motor 2 to rotate. When the forward/reverse signal is at the L level, the CW terminal of the connector 24 is at the L level, and the driver 8 drives the motor 2 to rotates in the reverse direction. When the operation/stop signal is at the L level, the RUN terminal is also at the L level, and, therefore, the driver 8 does not supply a driving signal to the motor 2.

The servo command circuit 14 has a counter 30 having a clock terminal CLK to which a clock signal at, for example, 3.2 KHz is applied from the CP terminal of the connector 23. The counter 30 has also a reset terminal RST to which an output signal of an OR gate 32 is applied. The OR gate 32 receives the operation/stop signal at its one input terminal. Accordingly, when the operation/stop signal is at its H level, the counter 30 is reset. The other input terminal of the OR gate 32 receives the pulse signal from the Hall effect device 12*a* inverted in an inverter 34 and differentiated in a differentiating circuit 36.

FIG. 3A shows the pulse signal from the Hall effect device 12*a*, FIG. 3B shows the output signal of the inverter 34, and FIG. 3C shows the output signal of the differentiating circuit 36. FIG. 3D shows the forward/reverse signal, FIG. 3E shows the output signal of the OR gate 32, and FIG. 3F shows the clock signal.

When receiving the reset signal, the counter 30 is reset to its initial count, e.g. zero (0), and starts counting the clock signal. During operation of the motor 2, the differentiated signal of the differentiating circuit 36 occurs at predetermined intervals, and, therefore, the counter 30 is reset before it counts a predetermined count, e.g. the count value at which its output terminal Q10 assumes the H level. Accordingly, as is seen from the left portion of the waveform shown in FIG. 3G, which shows the output at the Q10 terminal of the counter 30, the Q10 terminal of the counter 30 is at the L level. When the operation/stop signal changes its level to the L level and, therefore, no driving power is supplied to the motor 2, the interval between adjacent pulses of the pulse signal of the Hall effect device 12*a* increases as shown in the latter half portion of the waveform of FIG. 3A, resulting in increase of the interval between adjacent pulses of the reset signal. As a result, the Q10 output terminal of the counter 30 becomes high (H) before the counter 30 is reset. In this manner, the decrease of the rotation rate of the motor 2 to a rate below a predetermined rate is detected. The H level signal at the Q10 output terminal of the counter 30 is applied to one input terminal of a NOR gate 38, which receives at the other input terminal a differentiated signal, shown in FIG. 3H, resulting from differentiating a supply voltage in an differentiating circuit 40. Accordingly, the output signal of the NOR gate 38 assumes the L level when the power supply is connected, and when the rotation rate of the motor 2 decreases below the predetermined rotation rate, as shown in FIG. 3I.

The output signal of the NOR circuit 38 is coupled to an R1 terminal of an integrated circuit (IC) 42 in which four flip-flop circuits are integrated. The IC 42 receives at its S1 terminal, an inverted version (FIG. 3J) of the operation/stop signal prepared in an inverter 41. The IC 42 is arranged to provide a L level output signal at its Q1 terminal when the R1 terminal is at the L level with the S1 terminal assuming the H level. Thus, as shown in FIG. 3K, when the signal at the Q1 terminal of the IC 42 changes its level from the H level to the L level, and the rotation rate of the motor 2 decreases below the predetermined rate, the servo command signal is developed.

Next, the position detecting circuit 16 is described. The position detecting circuit 16 includes a rotation directing detecting circuit 44. The rotation direction detecting circuit 44 includes an AND gate 46 of which one input receives the output of the inverter 34 via the differentiating circuit 36. The AND gate 46 receives, at its other input terminal, the pulse signal from the Hall effect device 12*b*.

The rotation direction detecting circuit 44 includes further an inverter 48 to which the output of the inverter 34 is applied, and a differentiating circuit 50 which differentiates the output of the inverter 48. The output, differentiated signal of the differentiating circuit 50 is applied to one input of an AND gate 52, which receives, at the other input terminal, the pulse signal of the Hall effect device 12*c*. The output signals of the AND gates 46 and 52 are applied to a NOR gate 54.

FIGS. 4A, 4B and 4C show the pulse signals of the Hall effect devices 12*a*, 12*b* and 12*c*, respectively, and FIG. 4D shows the output signal of the differentiating circuit 50. Comparing the waveform shown in FIG. 4A with the one shown in FIG. 4D, it is seen that each time a pulse of the pulse signal of the Hall effect device 12*a* rises, a pulse occurs in the output signal of the differentiating circuit 50. The left portions of the waveforms shown in FIGS. 4A, 4B and 4C are the waveforms of the pulse signals when the motor 2 is rotating in the forward direction. When the motor 2 is rotating in the forward direction, the output signal of the AND gate 52, to which the output of the differentiating circuit 50 and the pulse signal from the Hall effect device 12*c* are applies, is as shown in the left portion of the waveform shown in FIG. 4E, from which it is understood that the output of the AND gate 52 assumes the H level in synchronization with the rising edge of the pulse signal of the Hall effect device 12*a*. The output signal of the differentiating circuit 36 is the differentiated version of the pulse signal from the Hall effect device 12*a* inverted in the inverter 34. Accordingly, as is understood from the waveform shown in FIG. 4F, the output signal of the differentiating circuit 36 is synchronized with the falling edge of the pulse signal from the Hall effect device 12*a*. The output signal of the AND gate 46 to which the output signal of the differentiating circuit 36 and the pulse signal from the Hall effect device 12b are applies assumes the H level in synchronization with the falling edge of the pulse signal from the Hall effect device 12a when the motor 2 is rotating in the forward direction., as shown in FIG. 4G. The output signal of the NOR gate 54 to which the output signals of the AND gates 46 and 52 are applied is shown in FIG. 4H, and it assumes the L level in synchronization with the rising and falling edges of the pulse signal of the Hall effect device 12a when the motor 2 is rotating in the forward direction.

The latter halves of the waveforms shown in FIGS. 4A through 4H are waveforms resulting when the motor 2 is rotating in the reverse direction.

As is shown in the right half portions of FIGS. 4D and 4C, when the output signal of the differentiating circuit 50 assumes the H level, the pulse signal of the Hall effect device 12c is at the L level, and, as shown in FIG. 4E, the output of the AND gate 52 is at the L level. Also, when the output signal of the differentiating circuit 36 is at the H level, the pulse signal of the Hall effect device 12b is at the L level, as is understood from the latter half portions of FIGS. 4F and 4B. In this case, the output signal of the AND gate 46 is at the L level as shown in the latter half portion of FIG. 4G. Accordingly, the output signal of the NOR gate 54 continues to be at the H level as shown in the latter portion of FIG. 4H. In this way, the output signal of the NOR gate 54 alternates between the H level and the L level when the motor 2 is rotating in the forward direction, but it maintains the H level when the motor 2 is rotating in the reverse direction.

The rotation direction detecting circuit 44 further includes an AND gate 56, an AND gate 58 and a NOR gate 60. The AND gate 56 receives the output signal of the differentiating circuit 36 and the pulse signal from the Hall effect device 12c. The AND gate 58 receives the output signal of the differentiating circuit 50 and the pulse signal of the Hall effect device 12b. The NOR gate 60 receives output signals from the AND gates 56 and 58. The output of the NOR gate 60 maintains to be at the H level when the motor 2 is rotating in the forward direction, while it assumes the L level in synchronization with the rising and falling edges of the pulse signal of the Hall effect device 12a when the motor 2 is rotating in the reverse direction, as is understood from the description of the operation of the AND gates 52 and 46 and the NOR gate 54 given above.

The output signal of the NOR gate 54 is applied to an S0 terminal of the IC 42, while the output signal of the NOR gate 60 is applied to an R0 terminal of the IC 42. The level at a Q0 terminal of the IC 42 depends on the levels of the signals at the S0 and R0 terminals. Assuming, for example, that the motor 2 is rotating in the forward direction, the pulse signal shown in the first half portion of FIG. 5A is applied to the S0 terminal, while the pulse signal at the H level shown in the first half of FIG. 5B is applied to the R0 terminal of the IC 42. As a result, the Q0 output of the IC 42 assumes the H level when the output signal of the NOR gate 54 first assumes the L level, as shown in the first half portion of FIG. 5C. The H level signal at the Q0 terminal is applied to an UP/DOWN terminal of a counter 62 S0 as to place the counter 62 in the count up condition, as shown in the first half portion of FIG. 5F. The H level signal at the Q0 terminal of the IC 42 is inverted in an inverter 66 and then applied to an UP/DOWN terminal of a counter 64 so that the counter 64 can count down. ENABLE terminals (PE) of the counters 62 and 64 receive the servo command signal at the L level from the Q1 terminal of the IC 42 when the motor speed decreases to a rotation speed below a predetermined value, as shown in the first half of FIG. 5E, so that they can start counting. Clock (CLK) terminals of the counters 62 and 64 receive an output signal, shown in the first half portion of FIG. 5D, from an OR gate 68 which receives the output signals of the differentiating circuits 36 and 50. As a result, when the rotating rate of the motor 2 rotating in the forward direction decreases below the predetermined value, the counter 62 starts counting up, as is understood from the first half portions of FIGS. 5G through 5J, which represent waveforms of output signals at Q0, Q1, Q2 and Q3 terminals of the counter 62, respectively, and the counter 64 starts counting down.

The output signals at the Q1 and Q2 terminals of the counter 62 are applied to an OR gate 70, and, therefore, the OR gate 70 develops an output which assumes the H level when the counter 62 counts the second clock pulse, as is shown in the first half portions of FIG. 5K. The H level signal is applied to an OR gate 72 which also receives an output signal at the Q0 terminal of the counter 62. Then, the output of the OR gate 72 assumes the H level when the first clock pulse is counted, as is shown in the first half portion of FIG. 5L. This H level signal from the OR gate 72 is applied to a clock (CLK) terminal of a D-type flip-flop 76 via an OR gate 74. The flip-flop 76 receives at its D input terminal the Q0 output of the IC 42, which is at the H level when the motor 2 is rotating in the forward direction, as previously described. Accordingly, the Q and $\overline{Q}$ terminals of the D-type flip-flop 76 are at the H and L levels, as shown in the first half portions of FIGS. 5M and 5N, respectively, when the rotation rate of the motor 2 rotating the forward direction decreases below the predetermined value.

The L level signal at the $\overline{Q}$ terminal of the flip-flop 76 is applied to one input of an AND gate 78, which also receives at its other input terminal an inverted version of the operation/stop signal through an inverter 41. The output of the AND gate is at the L level, which is applied to the CW terminal of the connector 24 through the OR gate 22. As a result, the driver 8 is commanded to rotate the motor 2 in the reverse direction.

Although detailed description is not given, the operation when the speed of the motor 2 rotating in the reverse direction decreases to a value below the predetermined value, will be understood from the description given heretofore and from the illustration in the latter half portions of the waveforms shown in FIGS. 5A through 5N. When the rotation rate of the motor 2 when it is rotating in the reverse direction decreases the predetermined value, the Q and $\overline{Q}$ terminals of the D-type flip-flop 76 assume the L and H levels, respectively. The H level at the $\overline{Q}$ terminal is coupled to the AND gate 78. At this instant, the output signal of the inverter 41 is at the H level since it is the inverted version of the L level operation/stop signal, and, therefore, the output signal of the AND gate 78 is at the H level, which is coupled to the CW terminal of the connector 24 via the OR gate 22. Accordingly, the driver 8 receives a command to rotate the motor 2 in the forward direction.

Next, the current control circuit 18 is described. The current control circuit 18 is for controlling the speed or rotation rate of the motor 2, and includes the counters 62 and 64 and the OR gate 70.

FIG. 6A shows the signal at the UP/DOWN terminal of the counter 62, FIG. 6B shows the CLOCK signal applied to the counter 62, and FIG. 6C is the ENABLE signal at the PE terminal of the counter 62. FIGS. 6D through 6G show the signals at the Q0, Q1, Q2 and Q3 terminals of the counter 62, respectively. As in the case of FIGS. 5A through 5N, the first half portions of FIGS. 6A through 6X are waveforms occurring when the motor 2 is rotating in the forward direction, the operation/stop signal has changed to the L level, and the rotation rate of the motor 2 has decreased below the predetermined value.

The output signal of the OR gate 70 assumes the H level when the second clock pulse occurs and continues to be at the H level until the eighth clock pulse occurs, as shown in the first half portion of FIG. 6H. This output signal of the OR gate 70 is applied to one input of an AND gate 80, which also receives, at its other input terminal, the output from the Q terminal of the D-type flip-flop 76. At this time, when the motor 2 is rotating in the forward direction, the operation/stop signal has changed to the L level, and the rotation rate of the motor 2 has decreased below the predetermined value, the output signal at the Q terminal of the D-type flip-flop 76 is at the H level, as shown in the first half portion of FIG. 6L. Then, the output of the AND gate 80 is at the H level, as shown in the first half portion of FIG. 6O, which level is coupled to one input of an AND gate 84 through the OR gate 82.

The other input of the AND gate 84 receives an inverted version of the output signal of the OR gate 26 from an inverter 86. As previously described, the OR gate 26 receives the operation/stop signal, which is, at this time, is at the L level. The other input of the OR gate 26 receives an output of an OR gate 88, to which an output of an AND gate 90 is applied. One input of the AND gate 90 receives the output at the Q3 terminal of the counter 62, which is at the L level in this instant. Accordingly, the output of the AND gate 90 is at the L level. An output of an AND gate 91 is applied to the other input of the OR gate 88. The AND gate 91 receives at its one input the output at the $\overline{Q}$ terminal of the D-type flip-flop 76, which, in this instant, is at the L level, as shown in the first half portion of FIG. 6M, and, therefore, the output of the AND gate 91 is at the L level. Since the output of the OR gate 88 is at the L level and, therefore, only L level signals are applied to the OR gate 26, the output of the inverter 86 is at the H level. Thus, the output signal (FIG. 6V) from the AND gate 84 assumes the H level from the time the second clock pulse occurs to the time immediately before the eighth pulse occurs.

The H level output signal from the AND gate 84 is applied to the RUN terminal of the connector 24 through the OR gate 28, which results in a command to be given to the driver 8 to drive the motor 2. The output signal from the OR gate 28 is shown in FIG. 6W.

The H level output signal of the AND gate 84 is also connected to a variable resistance device, e.g. a transistor 100, through a resistor 92, a zener diode 94, a diode 96 and an integrating circuit 98. The H level output signal of the AND gate 84 is coupled to the base of the transistor 100 in the illustrated example. The zener diode 94 is to limit the possible maximum value of the voltage to be applied to the integrating circuit 98 to a predetermined first value, e.g. 2 V. Accordingly, as is seen in the first half portion of FIG. 6X, the voltage applied to the base of the transistor 100 gradually increases toward 2 V, so that the current supplied from a DC source 102 through the transistor 100 to a SPEED terminal of the connector 24 gradually increases to a predetermined value, e.g. 1A, and the driver 8 causes the motor 2 to be braked in accordance with this current.

In this manner, when, for example, the motor 2 is rotating in the forward direction and the operation/stop signal commands the motor 2 to stop rotating, causing the rotation rate of the motor 2 to decrease to a rate below a predetermined value, the motor 2 is so energized as to rotate in the reverse direction, i.e. braked. If the motor 2 stops rotating within a period between the second clock pulse and the seventh clock pulse, which does not cause the count in the counter 62 to change, the output signal of the AND gate 84 is kept at the H level. Therefore, the voltage being applied to the SPEED terminal of the connector 24 does not change, and, therefore, the braking force exerted at that time is maintained.

If the rotation of the motor 2 does not stop even if the motor 2 is given reverse rotation energization, the Q0, Q1 and Q2 terminals of the counter 62 are placed at the L level and the Q3 terminal is placed at the H level, as is seen in the first half portions of FIGS. 6D through 6G. As a result, the output signal of the AND gate 80 changes to the L level, as shown in the first half portion of FIG. 6O, while the output of the AND gate 90 changes to the H level, as shown in the first half of FIG. 6P because the H level output at the Q3 terminal of the counter 62 and the H level output at the Q terminal of the D-type flip-flop 76 are applied to the AND gate 90. The H level output of the AND gate 90 is applied through the OR gates 88 and 26 to the inverter 86, resulting in an L level output signal developed by the AND gate 84, which, in turn, results in ceasing of the application to the transistor 100 of the voltage whose possible maximum value is limited to 2 V.

Instead, the H level output of the AND gate 90 is coupled through the OR gates 88 and 26, a resistor 104, a zener diode 106, a diode 108 and the integrating circuit 98 to the base of the transistor 100. The zener diode 106 is chosen to provide a possible maximum voltage of 5 V to the integrating circuit 98, so that a voltage increasing toward 5 V, as shown in the first half portion of FIG. 6X, is applied to the base of the transistor 100. A current corresponding to the voltage applied to the base of the transistor 100 is supplied to the SPEED terminal of the connector 24, and, therefore, the driver 8 brakes the motor 2 with a possible maximum current of, for example, 1.2 A. In this case, the H level output signal of the OR gate 26 is applied through the OR gate 28 to the RUN terminal of the connector 24, and, therefore, the application of a command to operate the motor 2 to the driver 8 continues.

When the rotation rate of the motor 2 rotating in the reverse direction decreases below a predetermined rate, the signal at the UP/DOWN (U/D) terminal of the counter 62 assumes the L level, as shown in the second or right half of FIG. 6A, so that the counter 62 is placed in the count-down mode of operation. At the same time, the counter 64 is placed in the count-up mode of operation to thereby start count-up operation in response to the clock signal, as shown in the second half portions of FIGS. 6I, 6J and 6K. The outputs at the Q1 and Q2 terminals of the counter 64 are coupled to the inputs of an OR gate 110, and, therefore, the OR gate 110 develops an H level output signal after the servo command signal occurs. The H level output signal of the OR gate 110 occurs upon the second clock pulse and continues until the eighth clock pulse, as shown in the second half portion of FIG. 6N, and is applied to an AND gate 112. The AND gate 112 receives the output signal developed at the $\overline{Q}$ terminal of the D-type flip-flop 76, too. The output signal at the $\overline{Q}$ terminal is at the H level since the motor 2 is rotating in the reverse direction. Accordingly, the output signal of the AND gate 112 (FIG. 6Q) is at the H level, which is coupled to the AND gate 84 through the OR gate 82. At this time, the output signal of the inverter 86 is at the H level. Specifically, the inverter 86 is supplied with the output signal of the OR gate 26, which, in turn, is supplied with the operation/stop signal (FIG. 6T) which is at the L level. The OR gate 26 receives also the output signal of the OR gate 88 which, in turn, is supplied with the output signal of the AND gate 90 and the output signal of the AND gate 91 (FIG. 6R). The output signal of the AND gate 90 is at the L level since the L level output signal of the D-type flip-flop 76 is applied to it, and the output signal of the AND gate 91 is also at the L level since the signal at the Q3 terminal of the counter 64, which is applied to the AND gate 91, is at the L level. Accordingly, the output signal of the OR gate 88 (FIG. 6S) is also at the L level, the output of the OR gate 26 (FIG. 6U) is also at the L level. The output signal of the AND gate 84 is at the H level. The H level output signal of the AND gate 84 is applied through the resistor 92, the zener diode 94, the diode 96 and the integrating circuit 98 to the base of the transistor 100, whereby the motor 2 is controlled in a manner similar to the one described above with reference to the rotation of the motor 2 in the forward direction. The H level output signal of the AND gate 84 is coupled through the OR gate 28 to the RUN terminal of the connector 24, which is then coupled as the rotation command signal to the driver 8.

Upon the occurrence of the eighth clock pulse, the level of the output signal of the OR gate 70 changes to the L level, so that the level of the output signal of the AND gate 84 changes to the L level, too. At the same time, the signal at the Q3 terminal of the counter 64 assumes the H level, which is coupled to the AND gate 91. The AND gate 91 receives also the H level signal from the $\overline{Q}$ terminal of the D-type flip-flop 76, and, therefore, its output signal is at the H level. The output signal at the H level from the AND gate 91 is coupled through the OR gates 88 and 26, the resistor 104, the zener diode 106, the diode 108 and the integrating circuit 98 to the transistor 100. The H level signal at the output of the OR gate 26 is coupled to the RUN terminal of the connector 24 through the OR gate 28, so that the rotation command signal remains at the H level. Like this, when the rotation rate of the motor 2 rotating in the reverse direction decreases below a predetermined rate, the motor 2 is energized to rotate in the forward direction, being controlled in a manner similar to the one described above with reference to the motor 2 rotating in the forward direction at a rotation rate lower than the predetermined rate.

In place of the Hall effect devices used in the above-described embodiment, other rotation detecting means, such as an encoder, may be used. Also, the control circuit 10 may be realized by a microcomputer rather than logic circuits. Further, the bipolar transistor 100 may be replaced by a FET. Also, OR gates may be used in place of the diodes 96 and 108.

The above-described embodiment is so arranged that if the rotation rate of the motor 2 cannot decrease sufficiently by one braking action, the braking force given to the motor 2 is increased. However, a single braking action may be sufficient in some case, and more than two braking actions may be required in some other cases.

What is claimed is:
1. A DC motor control apparatus comprising:
   a rotation detector generating a pulse signal each time a DC motor rotates a predetermined angle;
   a servo command circuit providing a servo command signal when the rotation rate of said DC motor is judged, based on said pulse signal, to have decreased below a predetermined rate in response to a stop command given to said motor;
   a rotation direction indicating circuit providing, when said servo command signal is generated, a rotation direction indicating signal based on said pulse signal to indicate that said motor should be rotated in an opposite direction;
   a braking force indicating circuit generating and holding a braking force indicating signal based on an actual rotation rate at which said motor rotates after said servo command signal is generated; and
   a driver causing said motor to rotate in the direction indicated by said rotation direction indicating signal, while applying to said motor a braking force based on said braking force indicating signal.
2. The DC motor control apparatus according to claim 1 wherein said servo command circuit comprises:
   a counter for counting a clock signal from a predetermined initial count each time said pulse signal is applied to said counter; and
   a servo signal generator for generating said servo command signal when said counter counts a predetermined count.
3. The DC motor control apparatus according to claim 1 wherein:
   said rotation detector comprises a first rotation detecting circuit for generating a first pulse signal as said pulse signal, and a second rotation detecting circuit for generating a second pulse signal as said pulse signal,
   said first and second rotation detecting circuits being arranged such that when said motor is rotating in a forward direction, said first pulse signal precedes said second pulse signal, and when said motor is rotating in a reverse direction, said second pulse signal precedes said first pulse signal; and
   said rotation direction indicating circuit receives said first and second pulse signals, said rotation direction indicating circuit generating a reverse rotation indicating signal as said rotation direction indicating signal when said first pulse signal precedes said second pulse signal, and generating a forward rotation indicating signal as said rotation direction indicating signal when said second pulse signal precedes said first pulse signal.
4. The DC motor control apparatus according to claim 1 wherein said braking force indicating circuit counts a clock signal prepared based on said pulse signal, and commands said driver to rotate said motor with a predetermined first braking force being applied to said motor when a count counted is within a predetermined first range, said braking force indicating circuit commanding said driver to rotate said motor with a predetermined second braking force, greater than said first braking force, being applied to said motor when said count is within a second range above said first range.
5. The DC motor control apparatus according to claim 1 wherein said rotation detecting circuit comprises a Hall effect device, and said servo command circuit, said rotation direction indicating circuit, and said braking force indicating circuit are realized by logic circuits.

* * * * *

UNITED STATES PATENT AND TRADEMARK OFFICE
CERTIFICATE OF CORRECTION

PATENT NO.   : 6,577,092 B2                                              Page 1 of 1
DATED        : June 10, 2003
INVENTOR(S)  : Shota Okai It is certified that error appears in the above-identified patent and that said Letters Patent is hereby corrected as shown below:

<u>Title page,</u>
Item [73], Assignee, delete "Himeji" and insert therefor -- Kasai --.

Signed and Sealed this

Thirtieth Day of December, 2003

JAMES E. ROGAN
*Director of the United States Patent and Trademark Office*